(12) United States Patent
Verdes et al.

(10) Patent No.: US 9,028,096 B2
(45) Date of Patent: May 12, 2015

(54) ANGLED STREET LIGHT FIXTURE

(75) Inventors: Anthony Verdes, Brick, NJ (US); Chakrakodi Vishnu Shastry, Princeton, NJ (US)

(73) Assignee: Dialight Corporation, Farmingdale, NJ (US)

( * ) Notice: Subject to any disclaimer, the term of this patent is extended or adjusted under 35 U.S.C. 154(b) by 0 days.

(21) Appl. No.: 13/253,153

(22) Filed: Oct. 5, 2011

(65) Prior Publication Data
US 2013/0088864 A1 Apr. 11, 2013

(51) Int. Cl.
| | |
|---|---|
| *F21V 29/00* | (2006.01) |
| *F21V 15/01* | (2006.01) |
| *F21V 3/00* | (2006.01) |
| *F21S 2/00* | (2006.01) |
| *F21S 8/08* | (2006.01) |
| *F21W 131/103* | (2006.01) |
| *F21Y 101/02* | (2006.01) |

(52) U.S. Cl.
CPC ........... *F21V 29/004* (2013.01); *F21V 29/2262* (2013.01); *F21V 29/2293* (2013.01); *F21V 29/262* (2013.01); *F21V 3/00* (2013.01); *F21S 2/005* (2013.01); *F21S 8/086* (2013.01); *F21V 15/011* (2013.01); *F21W 2131/103* (2013.01); *F21Y 2101/02* (2013.01); *Y02B 20/72* (2013.01)

(58) Field of Classification Search
CPC ..... F21V 15/01; F21V 15/011; F21V 17/002; F21V 17/006; F21V 17/104; F21V 17/10; F21V 17/12; F21V 17/14; F21V 21/005; F21V 21/00; F21V 21/12

USPC ........... 362/235, 249.02, 294, 373, 431, 153, 362/153.1, 238

See application file for complete search history.

(56) References Cited

U.S. PATENT DOCUMENTS

| | | | | | |
|---|---|---|---|---|---|
| 3,218,446 | A | * | 11/1965 | Langer | 362/86 |
| 3,737,654 | A | * | 6/1973 | Hawley | 362/311.06 |
| 7,513,639 | B2 | * | 4/2009 | Wang | 362/218 |
| 7,695,163 | B2 | * | 4/2010 | Yamada et al. | 362/294 |
| 8,025,428 | B2 | * | 9/2011 | Duguay et al. | 362/311.02 |
| 8,061,869 | B2 | * | 11/2011 | Lo | 362/249.02 |
| 8,267,544 | B2 | * | 9/2012 | Zheng et al. | 362/249.02 |
| 8,322,881 | B1 | * | 12/2012 | Wassel | 362/247 |
| 2006/0012997 | A1 | | 1/2006 | Catalano et al. | |
| 2008/0062689 | A1 | | 3/2008 | Villard | |
| 2009/0009362 | A1 | | 1/2009 | Miller | |
| 2009/0244894 | A1 | * | 10/2009 | Zhou et al. | 362/249.02 |
| 2009/0251906 | A1 | * | 10/2009 | Liu et al. | 362/431 |
| 2009/0262533 | A1 | * | 10/2009 | Liu et al. | 362/249.02 |
| 2010/0302783 | A1 | | 12/2010 | Shastry et al. | |
| 2011/0019409 | A1 | | 1/2011 | Wronski | |

(Continued)

OTHER PUBLICATIONS

International Search Report and Written Opinion for PCT/US2012/058725, Dec. 27, 2012, consists of 8 pages.

*Primary Examiner* — William Carter
*Assistant Examiner* — Kenny C Sokolowski (57) ABSTRACT

The present disclosure relates generally to a modular angled light engine. In one embodiment, the modular angled light engine includes a center portion comprising an interlocking feature to connect to a second modular angled light engine and at least one housing coupled to the center portion. The at least one housing includes a heat sink coupled to a first side of the at least one housing, at least one light emitting diode (LED) coupled to an interior volume of the at least one housing and a lens covering the at least one LED and coupled to a second side of the at least one housing.

9 Claims, 10 Drawing Sheets

(56) References Cited

U.S. PATENT DOCUMENTS

2011/0060701 A1* 3/2011 Verfuerth et al. ............. 705/500
2011/0075409 A1* 3/2011 Zheng ........................... 362/231
2011/0194281 A1 8/2011 Josefowicz et al.
2011/0219650 A1* 9/2011 Wright et al. ................... 40/559
2011/0317420 A1* 12/2011 Jeon et al. ................ 362/249.02
2012/0127727 A1* 5/2012 Wan-Chih et al. ............ 362/294

* cited by examiner

ANGLED STREET LIGHT FIXTURE

BACKGROUND

Present street light fixtures designs are inefficient and suffer a large amount of light loss. For example, street lighting requires light to be bent at high angles to achieve uniformity and higher pole spacing. The light fixture suffers with increased Fresnel reflection losses when light transmits through the flat lens at high angles. As a result, the current street light fixtures suffer from increased Fresnel reflection losses when it transmits light through the lens.

SUMMARY

The present disclosure relates generally to a modular angled light engine. In one embodiment, the modular angled light engine comprises a center portion comprising an interlocking feature to connect to a second modular angled light engine and at least one housing coupled to the center portion. The at least one housing comprises a heat sink coupled to a first side of the at least one housing, at least one light emitting diode (LED) coupled to an interior volume of the at least one housing and a lens covering the at least one LED and coupled to a second side of the at least one housing.

The present disclosure also provides an angled street light fixture. In one embodiment, the angled street light fixture comprises a base and a modular angled light engine coupled to the base. The modular angled light engine comprises a center portion and at least one housing coupled to the center portion. The at least one housing comprises a heat sink coupled to a first side of the at least one housing, at least one light emitting diode (LED) coupled to an interior volume of the at least one housing and a lens covering the at least one LED and coupled to a second side of the at least one housing.

The present disclosure also provides another embodiment for a modular angled light engine. In one embodiment, the angled light engine comprises a center portion and a first heat sink and a second heat sink coupled to the center portion on opposing sides of the center portion, wherein at least one light emitting diode (LED) is coupled to each one of the first heat sink and the second heat sink, wherein the first heat sink and the second heat sink are angled towards one another.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Embodiments of the present disclosure are directed towards an angled street light fixture comprising modular angled light engines. As noted above, present street light fixture designs are inefficient, in terms of lumens per Watt, and suffer a large amount of light loss.

Street lighting requires light to be bent at high angles to achieve uniformity and higher pole spacing. The light fixture suffers with increased Fresnel reflection losses when light transmits through the flat lens at high angles. As a result, the current street light fixtures suffer from increased Fresnel reflection losses when it transmits light through the lens.

There are Fresnel reflection losses at each interface between two media of different refractive index. Due to Fresnel reflection losses, there is a loss of total light transmission through a refractive surface (such as a flat glass or clear plastic) as the angle of incidence increases. Typically, the percentage of light transmission through the refractive surface remains relatively high and stable up to a certain angle of incidence until the percentage of light transmission drops off sharply.

For example, for a flat polycarbonate lens, the percentage of light transmission remains at approximately 85% up to an incident angle of 55 degrees. This angle at which the transmission falls quickly is different for different materials. Thus, the angle of mechanical bend will vary with the refractive material that is used as a window for the fixture. Past 55 degrees, the percentage of light transmission falls quickly from approximately 85% to 40% at an incident angle of 80 degrees. Thus, as can be seen, street lighting that requires light to be bent at high angles can suffer from a large amount of light loss and perform inefficiently.

One embodiment of the disclosure solves this problem by angling the street light fixture to combine mechanical solutions with the optical properties of the street light fixture. For example, a portion of the street light fixture may be bent to maximize the optical efficiency of the street light fixture in terms of lumens per Watt. The amount of bending may be determined based on various factors such as the type of refractive surface and the desired amount of light bending. Using the flat polycarbonate lens example above, if the required amount of light bending is 80 degrees, a portion of the street light fixture may be bent downwards 25 degrees in a direction towards a surface of a street. As a result, combining the 25 degree bend in the portion of the street light fixture and the maximum efficiency of light through a flat polycarbonate lens at a 55 degree incident angle provides the most efficient light output that bends light up to 80 degrees.

Figure 1:
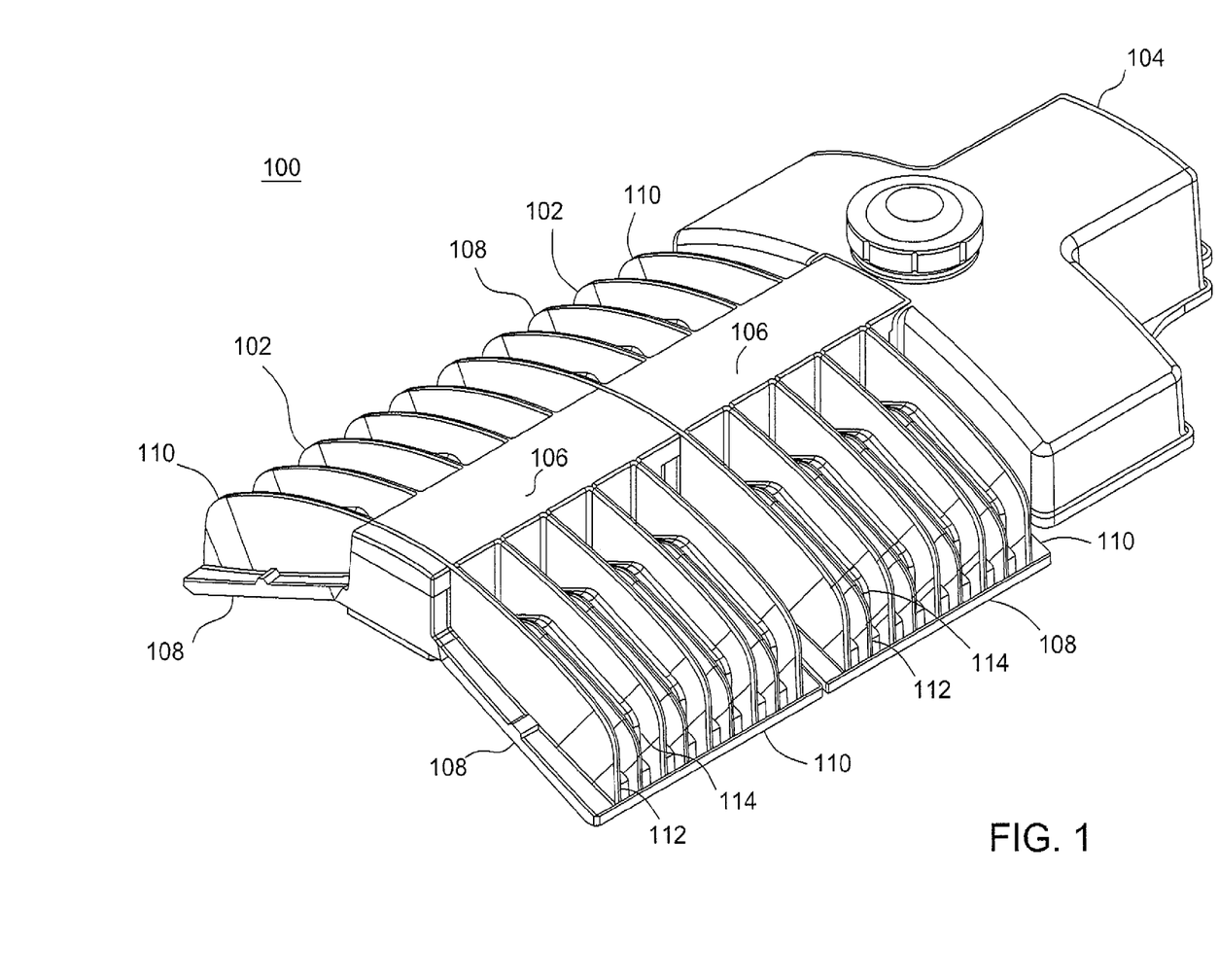
FIG. 1 depicts a top isometric view of an angled street light fixture having a plurality of modular angled light engines.

FIG. 1 illustrates one embodiment of an angled street light fixture 100 of the present disclosure. In one embodiment, the angled street light fixture comprises one or more modular angled light engines 102 and a base 104. For example, a first modular angled light engine 102 may be coupled to the base 104 and then a second modular angled light engine 102 may be coupled to the first modular angled light engine 102 and so forth up to a desired number of modular angled light engines 102. Although only two modular angled light engines 102 are illustrated in FIG. 1, it should be noted that any number of modular angled light engines 102 may be used.

The modular design of the angled street light fixture 100 provides flexibility in applications and efficiency in repair. For example, each modular angled light engine 102 may have a certain amount of Wattage, e.g., 60 Watts. As a result, if a lighting application requires 120 Watts of light, two of the modular angled light engines 102 may be used to provide a sufficient amount of light output. Moreover, if lighting requirements change over the course of time, the lighting requirements may be met by simply adding or removing additional modules to the angled light engine 102.

In addition, the modular design provides for more efficient repair of the angled street light fixture 100 if one of the modular angled light engine 102 fails. As will be discussed below in further detail, each modular angled light engine 102 may be independently powered. As a result, if one of the modular angled light engines 102 fails, then only the failed module needs to be replaced. All of the other properly operating modules may be left. As a result, this reduces the cost of maintenance as the entire street light fixture 100 does not need to be replaced.

In one embodiment, the modular angled light engine 102 may comprise a center portion 106 and at least one housing 108 coupled to the center portion 106. In one embodiment, two housings 108 are coupled to the center portion 106 on opposing sides of the center portion 106.

In one embodiment, the modular angled light engine 102 may comprise at least one heat sink 110 coupled to the center portion 106. In one embodiment, the modular angled light engine 102 may comprise a first heat sink 110 and a second heat sink 110 coupled to the center portion 106 on opposing sides of the center portion 106.

In one embodiment, the heat sink 110 may be part of the housing 108 and coupled to a first side of the housing 108. In other words, each housing 108 may also include a heat sink 110 coupled to a first side of the housing 108. In another embodiment, the heat sink 110 may be the housing 108. In other words, in one embodiment, the heat sink 110 and the housing 108 may be formed by one continuous surface.

In one embodiment, the heat sink 110 may comprise one or more heat sink fins 112 and 114. In one embodiment, the heat sink fins 112 and 114 may be different sizes. For example, the heat sink fins 112 may be larger than the heat sink fins 114.

Figure 7:
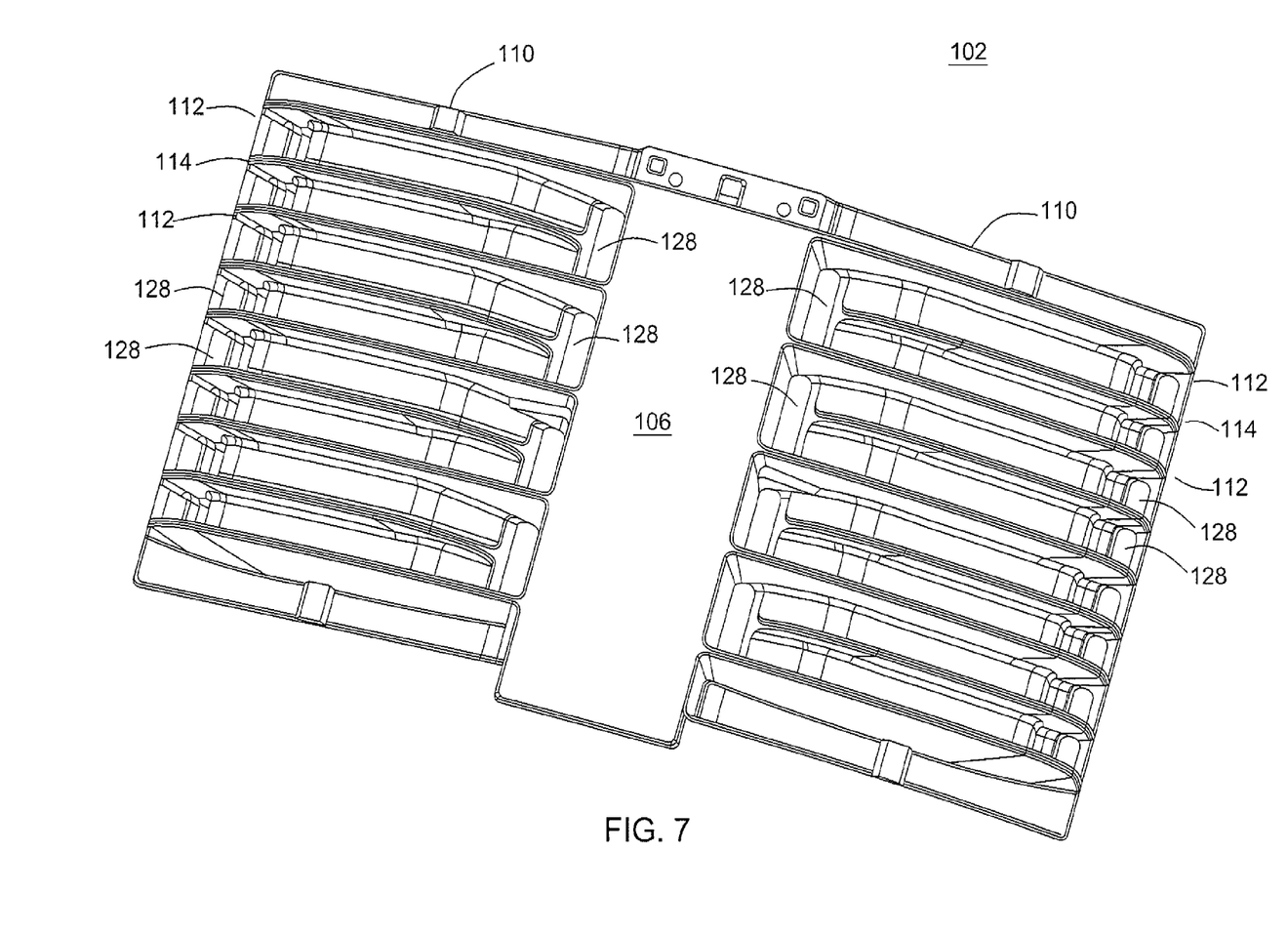
FIG. 7 depicts a top isometric view of a single modular angled light engine.

In addition, FIG. 7 illustrates a top isometric view of the modular angled light engine 102. FIG. 7 illustrates the plurality of venting holes 128 in the heat sink 110. In one embodiment, the plurality of venting holes 128 may be different sizes. For example, the venting holes 128 near the center portion 106 may be larger than the venting holes 128 on an edge away from the center portion 106.

In one embodiment, the design of the heat sink 110 with the venting holes 128 and the different sized heat sink fins 112 and 114, may create a vacuum that pulls air through venting holes 128 of the heat sink 110. For example, the heat sink 110 may help to create a thermal plume that rises above the angled street light fixture 110.

Figure 10:
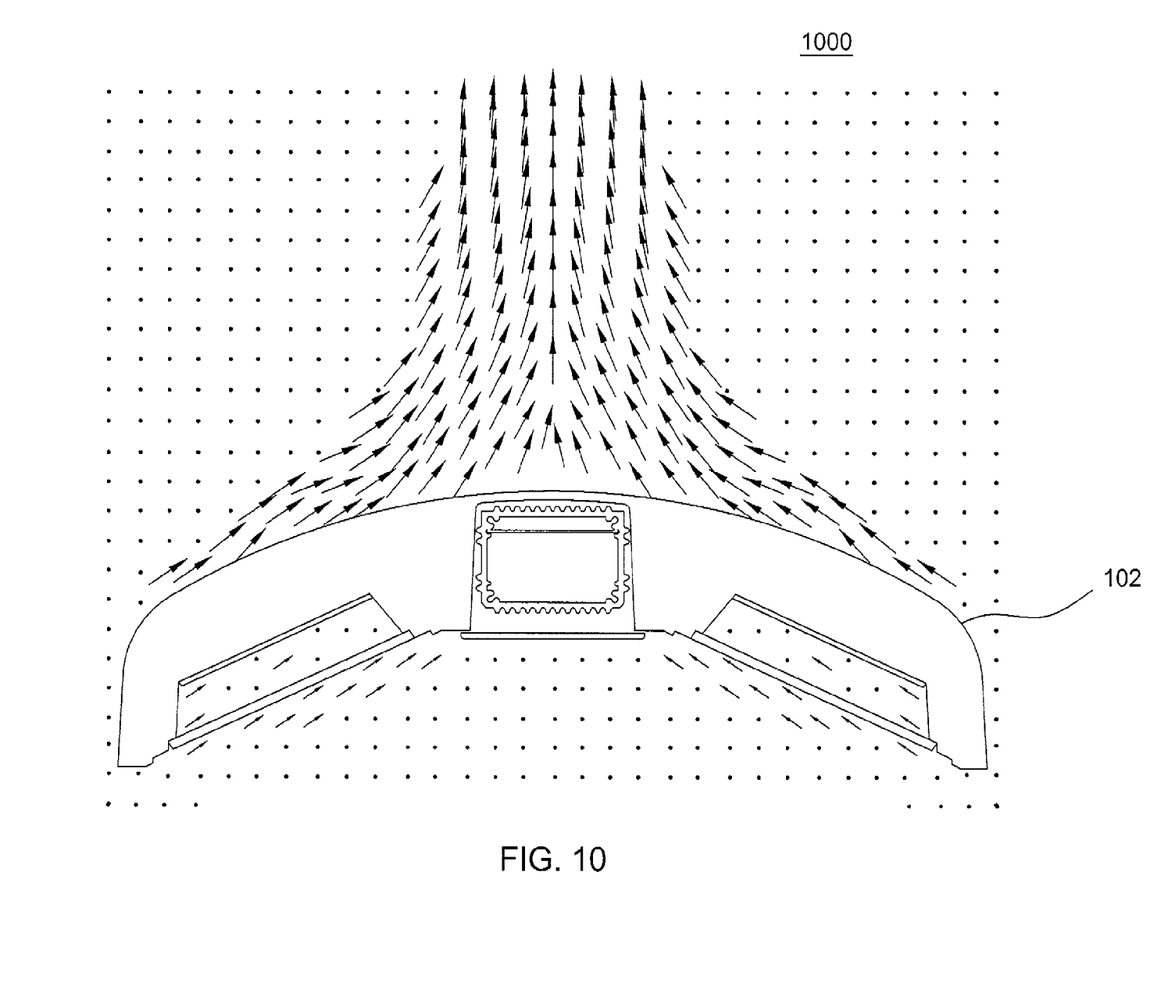
FIG. 10 depicts a heat loss profile of the angled street light fixture.

An example of the thermal plume is illustrated in FIG. 10. FIG. 10 illustrates a thermal plume profile 1000 of the modular angled light engine 102. The arrows illustrate the air flow of the thermal plume profile 1000. As illustrated by FIG. 10, the air is pulled upward through the heat sink 110 and most of the heat is concentrated over the center portion 106.

Figure 2:
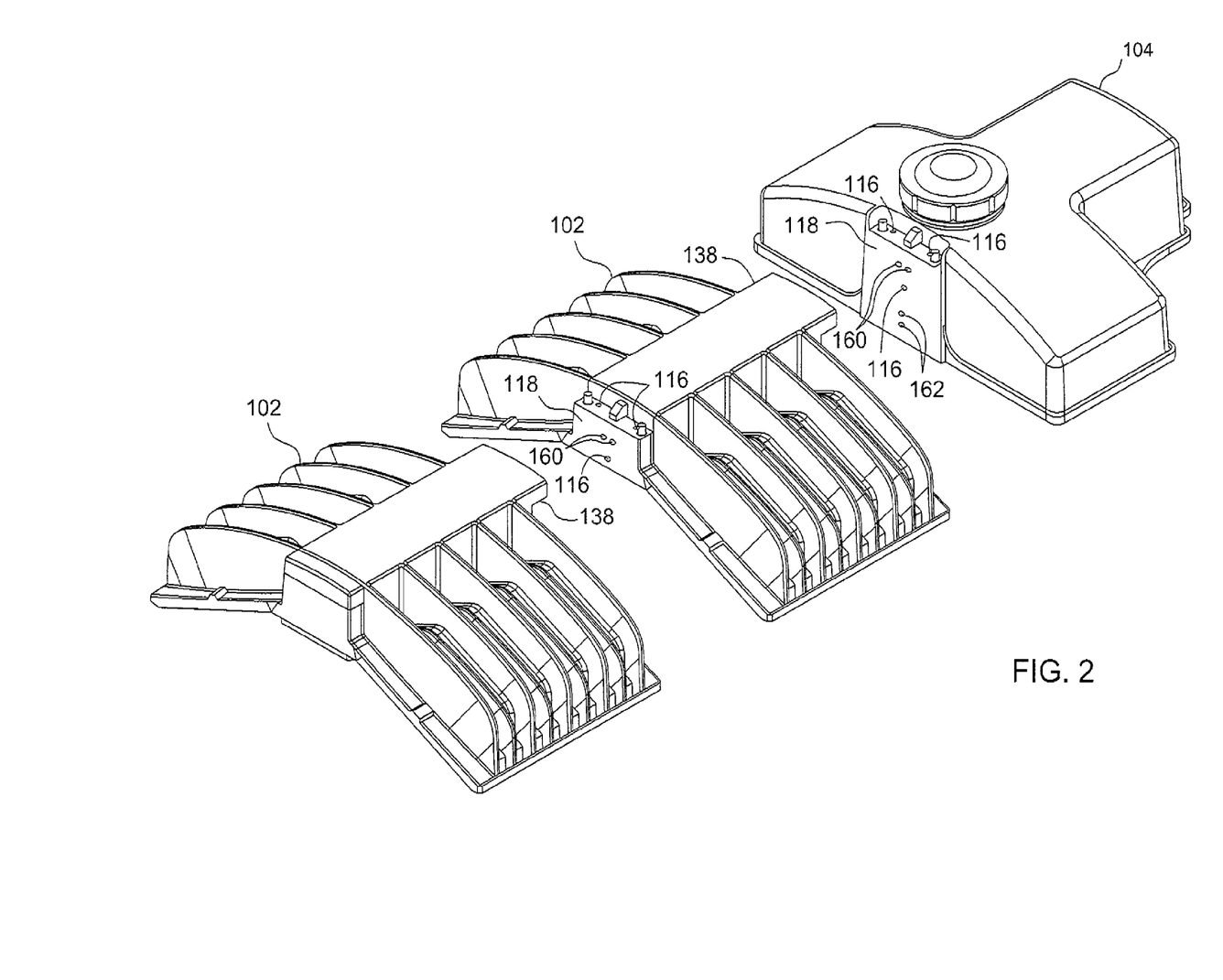
FIG. 2 depicts an exploded top isometric view of the angled street light fixture and each separate modular angled light engine.

FIG. 2 illustrates an exploded top isometric view of one embodiment of the angled street light fixture 100. As illustrated by FIG. 2, each modular angled light engine 102 may be coupled to the base 104 and to other modular angled light engines 102 via one or more threaded openings 116 and one or more interlocking features 118 and 138. In one embodiment, the base 104 may include one or more openings 162 for latching the base 104 to a modular angled light engine 102.

In one embodiment, the interlocking features 118 and 138 may include any mechanical feature used for interlocking two components together. For example, the interlocking features 118 and 138 may include a snap and lock interlocking feature, a slotted interlocking feature and the like.

In one embodiment, each one of the modular angled light engines 102 may include both the interlocking features 118 and 138. For example, the interlocking feature 118 may comprises a male portion and the interlocking feature 138 may comprises a female portion. As a result, two modular angled light engines 102 may be mechanically coupled or connected together by mating the interlocking feature 118 of a modular angled light engine 102 to the interlocking feature 138 of another modular angled light engine 102.

Once a modular angled light engine 102 is coupled to the base 104 or another modular angled light engine 102 via the interlocking features 118 and 138, it may be secured using a screw through the threaded opening 116. In one embodiment, one or more openings 160 may be provided for wire pass throughs. A more detailed view is illustrated in FIGS. 8 and 9.

Figure 8:
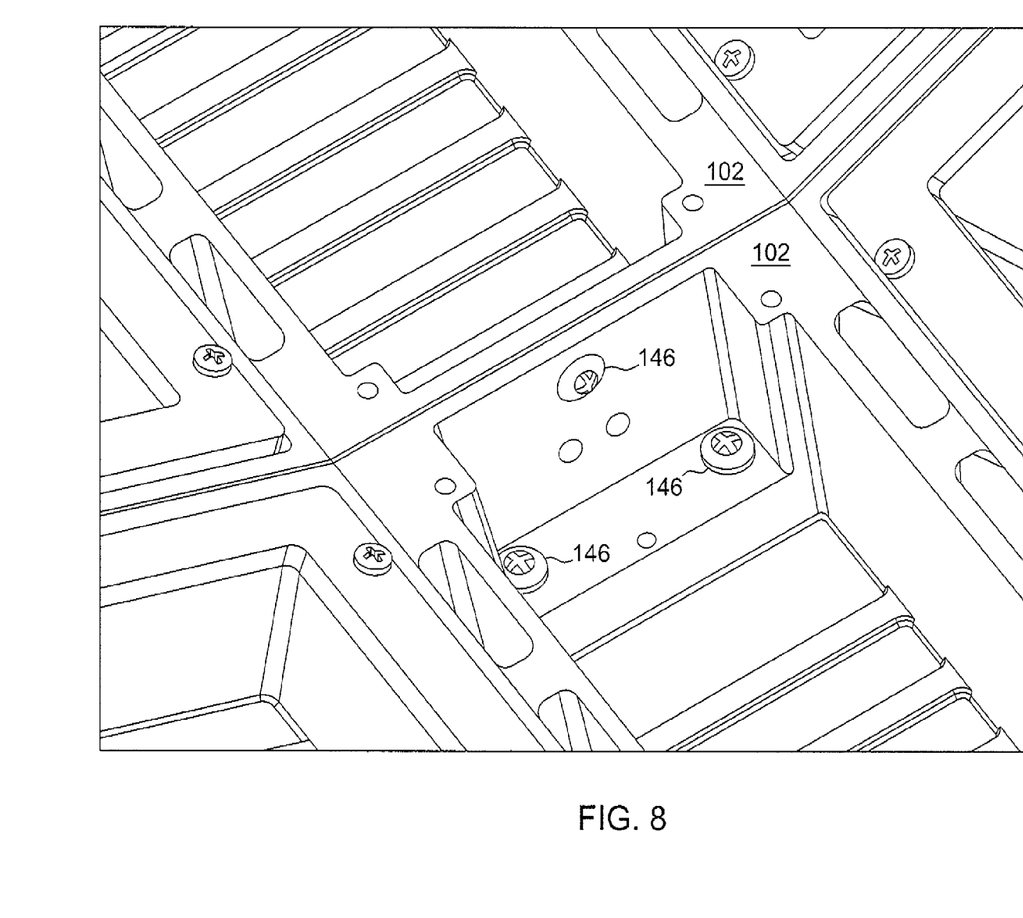
FIG. 8 depicts a front isometric view of the mechanical connections between two modular angled light engines.
Figure 9:
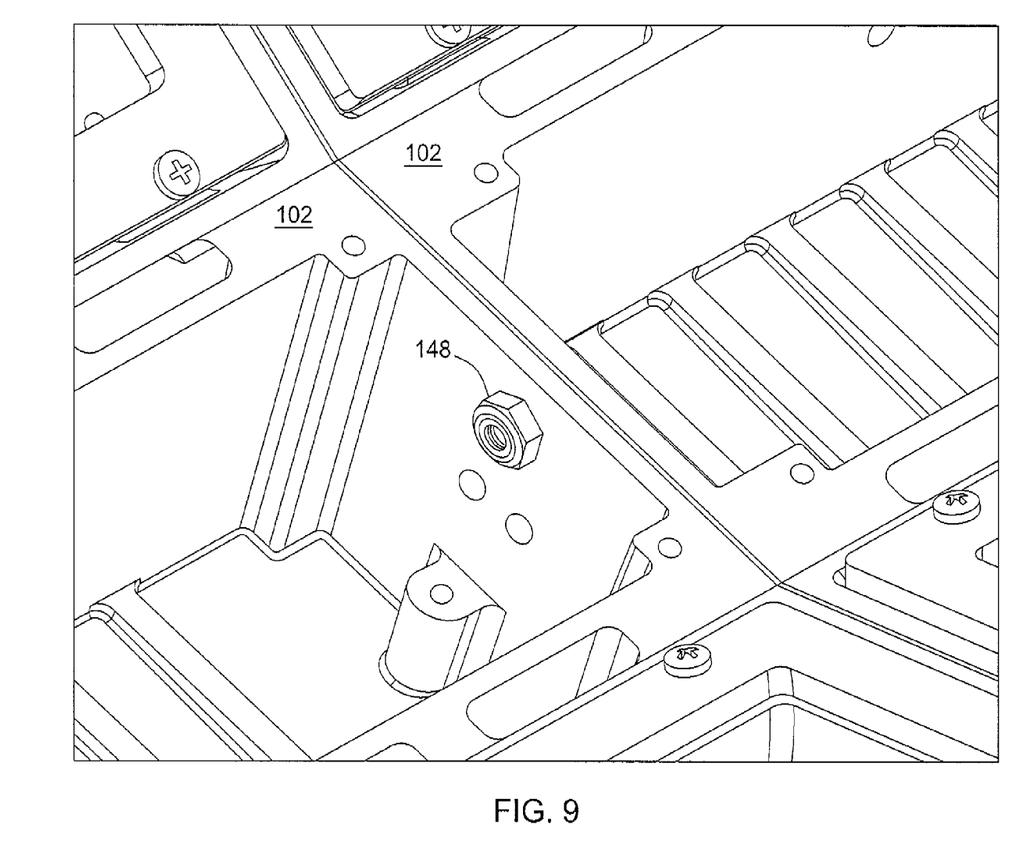
FIG. 9 depicts a back isometric view of the mechanical connections between two modular angled light engines.

FIG. 8 illustrates one embodiment of a front isometric view of a mechanical connection between two of the modular angled light engines 102. FIG. 9 illustrates one embodiment of a back isometric view of the mechanical connection between two of the modular angled light engines 102. As noted above, once the two modular angled light engines 102 are coupled together using the interlocking features 118 and 138, the two modular angled light engines 102 may be secured using one or more fasteners 146 that are fitted through the threaded openings 116. In one embodiment, the fastener 146 may be for example, a bolt or a screw. In one embodiment, the one or more screws 146 may be further secured using a nut 148, as illustrated in FIG. 9. It should be noted that although the mechanical connection is illustrated as a nut and bolt, any type of mechanical connection may be used to secure the two modular angled light engines 102 together. Also it should be noted that a similar mechanical connection may be made between a modular angled light engine 102 and the base 104.

Figure 3:
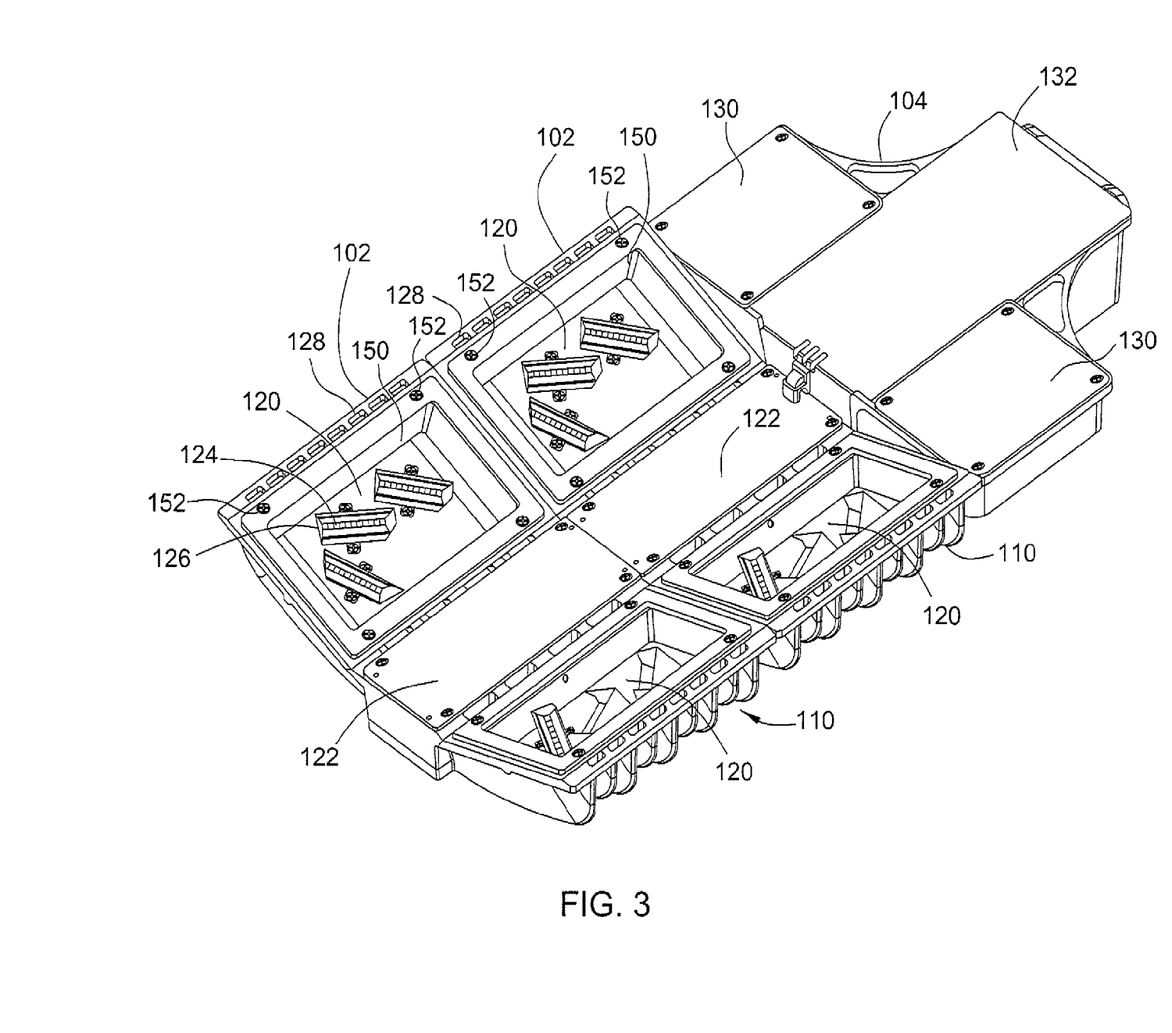
FIG. 3 depicts a bottom isometric view of the angled street light fixture.

FIG. 3 illustrates a bottom isometric view of one embodiment of the angled street light fixture 100. In one embodiment, the base 104 may include one or more chambers 130. In one embodiment, one of the chambers 130 may be used for a communication assembly. For example, the angled street light fixture 100 may be installed as part of a smart lighting network that may communicate back to central office. The chambers 130 provide an area to install the communication assembly. In one embodiment, one of the chambers 130 may be used for a surge assembly to protect the angled street light fixture 100 from power surges that may short all of the modular angled light engines 102.

Figure 6:
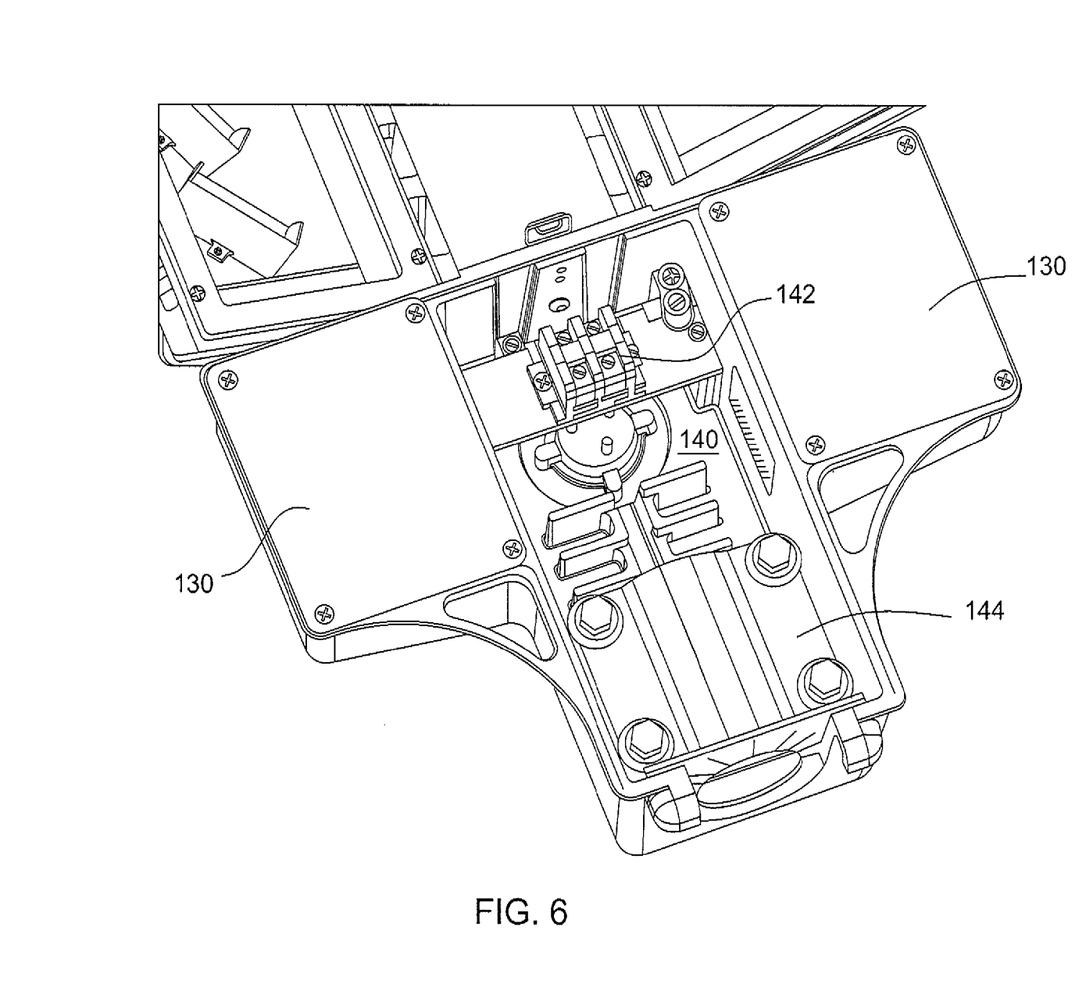
FIG. 6 depicts a bottom view of a base of the angled street light fixture.

In one embodiment, the base 104 may also include a center portion 132 that includes an interior volume 140. FIG. 6 illustrates a bottom view of the base 104 having the interior volume 140. In one embodiment, the interior volume may have one or more electrical terminals 142 to make electrical connections to the modular angled light engines 102 or the optional assemblies in the chambers 130. In addition, the interior volume 140 may include a pole mounting bracket 144 for mounting the angled street light fixture 100 to a street pole.

Referring back to FIG. 3, the modular angled light engine 102 may include an interior volume 120 in the housing 108. Within the interior volume 120 may be one or more light assemblies 124. The light assembly 124 may be, for example, a light emitting diode (LED). In one embodiment, the light assemblies 124 use LEDs having a high wattage sufficient enough to illuminate large areas such as a street or a sidewalk. The one or more light assemblies 124 may be arranged in any configuration within the interior volume 120 as necessary to meet any requirements for lighting applications.

In one embodiment, the one or more light assemblies 124 may also include a reflector 126. The reflector 126 may include any type of reflective materials such as, for example, a metallized plastic. The light assemblies 124 may also include a lens or refractive optics or combination of refractive and reflective optics.

In one embodiment, the one or more light assemblies 124 may be covered by a lens 150. The lens 150 may be secured to the housing 108 via one or more fasteners 152, for example, a screw, bolt or an adhesive. The lens 150 may be any optical clear material, such as for example, polycarbonate or glass. It should be noted that the lens 150 may simply be a transparent cover that does not provide any optical amplification.

Figure 5:
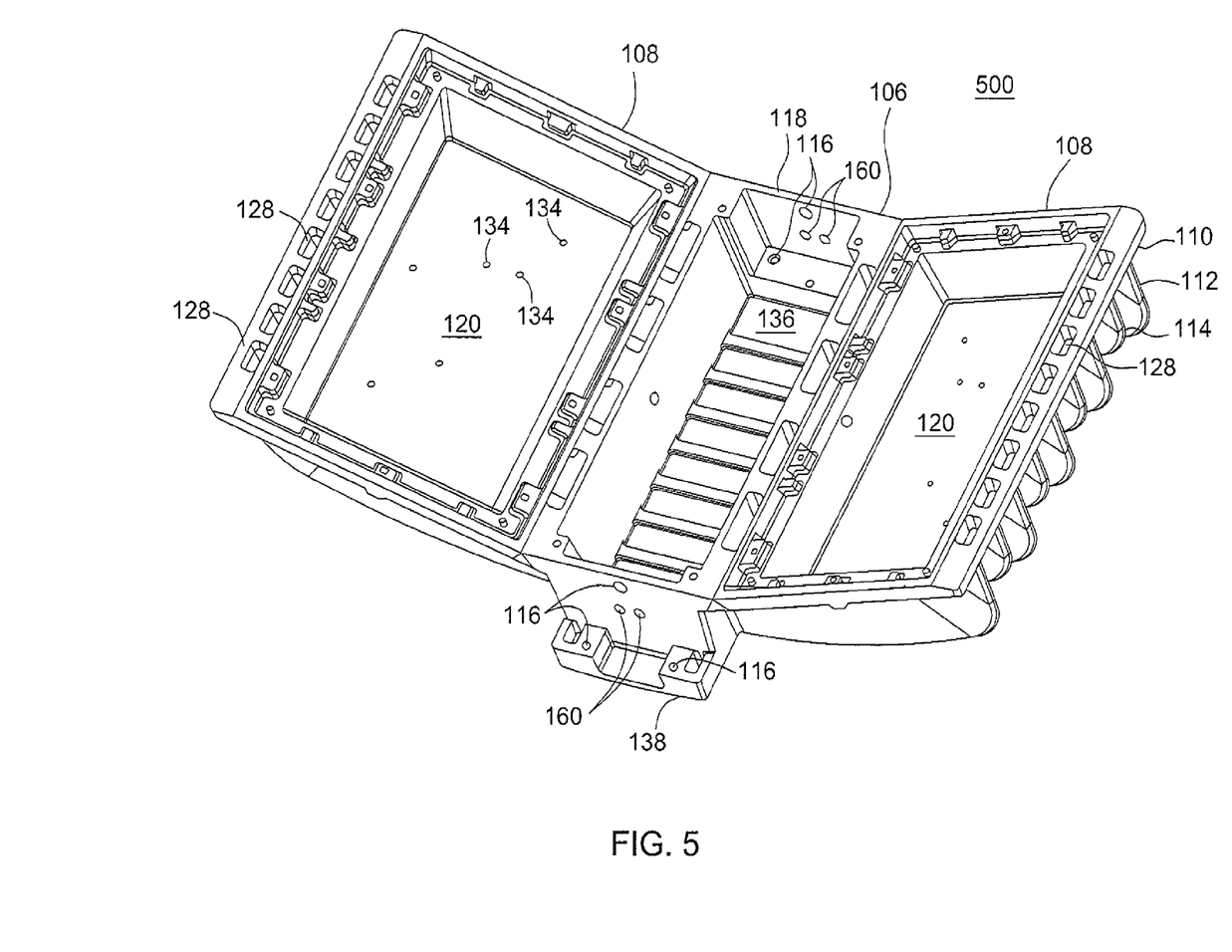
FIG. 5 depicts a bottom isometric view of an empty single modular angled light engine housing.

FIG. 5 illustrates a bottom isometric view of one embodiment of an empty modular angled light engine housing 500 without the one or more light assemblies 124. In one embodiment, the one or more light assemblies 124 may be coupled to the interior volume 120 of the housing 108 via one or more threaded openings 134.

In one embodiment, the center portion 106 may include an interior volume 136. The interior volume 136 may hold a driver for the modular angled light engine 102. In other words, each modular angled light engine 102 of an angled street light fixture 100 may be independently powered. As a result, if one of the modules fails, only the failed module needs to be replaced. The remaining modules that are operating properly need not be replaced. This provides lower costs and more efficient maintenance of the angled street light fixture 100 compared to other street light fixtures.

Figure 4:
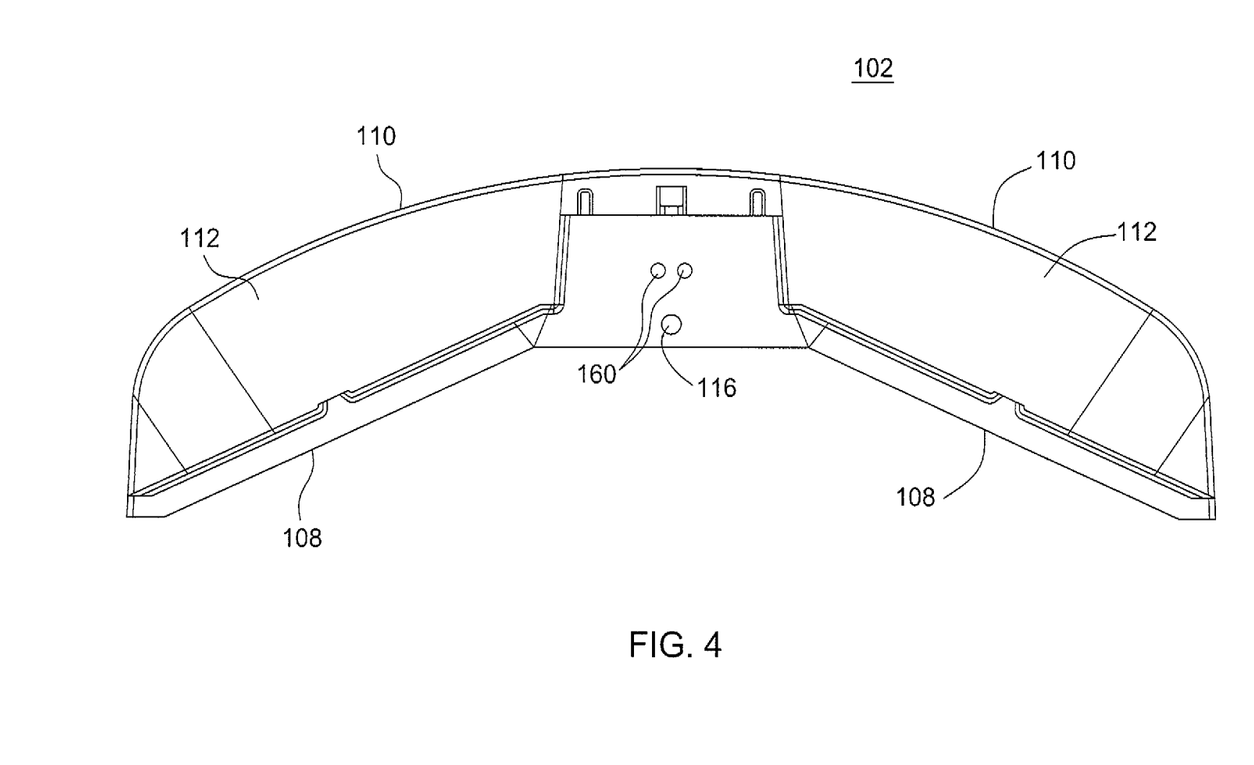
FIG. 4 depicts a front side view of a single modular angled light engine.

As discussed above, the angled street light fixture 100 combines mechanical solutions with optical properties to reduce the amount of Fresnel optical loss through the lens. FIG. 4 illustrates a front side view of one embodiment of the modular angled light engine 102. FIG. 4 helps to illustrate how the housings 108 and/or the heat sinks 110 are angled. In one embodiment, the housings 108 and the heat sinks 110 are angled downward towards a surface of the street. Said another way, the housings 108 and the heat sinks 110 are angled towards a side that emits light from the one or more light assemblies 124. Said yet another way, the housings 108 and/or heat sinks 110 are angled towards one another.

The angle at which the housings 108 and the heat sinks 110 are bent may be a function of one or more parameters. In one embodiment, the parameters may include the lighting application requirements and the type of material used for the lens and a shape of the lens. For example, some street lighting application may require light to be bent up to 80 degrees.

As an example, the modular angled light engine 102 may have a flat polycarbonate lens. As noted above, the flat polycarbonate lens has a sharp drop off in terms of transmission percentage at an incident angle of approximately 55 degrees. Thus, to compensate for the optical loss from 55-80 degrees, each one of the housings 108 may each be bent approximately 25 degrees towards one another to provide maximum efficiency of the light output for the 80 degree bend. In one embodiment, the 25 degrees may have a tolerance of approximately +/−10 degrees.

It should be noted that the angle at which the housing 108 and/or the heat sink 110 is bent may vary depending on the lighting application requirements and the one or more parameters noted above. As a result, the above example is only one example given the specific parameters discussed above should not be considered limiting.

In addition, the angle at which each one of the housings 108 are bent may be different depending the lighting application requirements. For example, if the modular angled light engine 102 has two housings 108, then one housing 108 may be bent at a different angle than the other housing 108. In another embodiment, one housing 108 may not be bent and the other housing 108 may be bent.

It should be noted that in one embodiment, the one or more light assemblies 124 are installed such that they are parallel with the lens 150. In other words, an optical axis of the light engine is perpendicular with the lens 150. This is in contrast to other street lights that attempt to achieve the required amount of bending by angling the light engines within a housing that is flat or parallel to the street surface. However, installing the light engines at an angle within the housing is inefficient due to less light being refracted through the lens. In other words, the embodiments of the present disclosure are advantageous because it maintains optimal efficiency of the light assemblies 124 while achieving high bending of the light using the mechanical bend of the housing 108 and/or heat sink 110 at a desired angle.

The bending of the housings 108 and/or the heat sinks 110 of the modular angled light engine 102 also provide other advantages. For example, moisture, such as rain or snow, or debris, such as dust, may slide off of the modular angled light engine 102 and not collect on top of the modular angled light engine 102.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An angled street light fixture, comprising:
   a base;
   a first modular angled light engine coupled to the base; and
   a second modular angled light engine coupled to the first modular angled light engine, wherein the first modular angled light engine and the second modular angled light engine each comprises:
      a center portion comprising an interlocking feature, wherein the interlocking feature comprises a male portion on a first side of the center portion and a female portion on a second side of the center portion and a wire-pass through opening;
      a first housing coupled to the center portion; and
      a second housing coupled to the center portion, wherein the first housing and the second housing each comprises:
         a heat sink coupled to a first side of at least one of the first housing and the second housing;
         at least one light emitting diode (LED) coupled to an interior volume of at least one of the first housing and the second housing; and a lens covering the at least one LED and coupled to a second side opposite the first side of at least one of the first housing and the second housing, wherein the second modular angled light engine is coupled to the first modular angled light engine via the male portion of the interlocking feature on the first side of the center portion of the first modular angled light engine mated with the female portion of the interlocking feature on the second side of the center portion of the second modular angled light engine.

2. The angled street light fixture of claim 1, wherein the base comprises:

an interior volume comprising a terminal for one or more electrical connections and a pole mounting bracket;

a first chamber coupled to the base comprising a communication assembly; and a second chamber coupled to the base comprising a surge assembly.

3. The angled street light fixture of claim 1, wherein at least one of the first housing and the second housing is angled to achieve a desired total amount of light bending.

4. The angled street light fixture of claim 3, wherein the desired total amount of light bending is approximately 80degrees.

5. The angled street light fixture of claim 4, wherein at least one of the first housing and the second housing is angled at approximately 25degrees, 25 degrees, +/−10 degrees.

6. The angled street light fixture of claim 1, wherein the heat sink comprises a plurality of heat sink fins, wherein the plurality of heat sink fins comprise different sized fins.

7. The angled street light fixture of claim 1, wherein the heat sink includes one or more venting holes.

8. The angled street light fixture of claim 1, wherein the center portion comprises a driver.

9. The angled street light fixture of claim 1, wherein an additional modular angled light engine is added to obtain a desired amount of light output.

* * * * *